US009705860B2

(12) United States Patent
Doui

(10) Patent No.: US 9,705,860 B2
(45) Date of Patent: Jul. 11, 2017

(54) DEVICE ADMINISTRATION APPARATUS, DEVICE ADMINISTRATION METHOD AND RECORDING MEDIUM

(75) Inventor: Takayuki Doui, Kawanishi (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 1403 days.

(21) Appl. No.: 12/247,754

(22) Filed: Oct. 8, 2008

(65) Prior Publication Data
US 2009/0106828 A1 Apr. 23, 2009

(30) Foreign Application Priority Data

Oct. 12, 2007 (JP) .................. 2007-267261

(51) Int. Cl.
H04L 29/06 (2006.01)
G06F 21/60 (2013.01)
H04L 12/24 (2006.01)

(52) U.S. Cl.
CPC ............ H04L 63/08 (2013.01); G06F 21/604 (2013.01); H04L 41/0233 (2013.01); H04L 41/28 (2013.01)

(58) Field of Classification Search
CPC ................ H04L 63/08; G06F 21/604
USPC ........ 726/2, 27; 380/247–250; 713/155–159, 713/168–186
See application file for complete search history.

(56) References Cited

U.S. PATENT DOCUMENTS 5,651,006 A 7/1997 Fujino et al.
5,850,582 A * 12/1998 Inoo et al. ................... 399/8
5,935,262 A * 8/1999 Barrett et al. .................. 714/46
6,105,066 A * 8/2000 Hayes, Jr. ..................... 709/226
6,622,266 B1 * 9/2003 Goddard ............ G06F 11/0733 714/44
7,552,467 B2 * 6/2009 Lindsay .......................... 726/5
7,594,178 B2 * 9/2009 Sakai ............................. 715/736
7,804,607 B2 * 9/2010 Tomita et al. ............... 358/1.13
2002/0196451 A1 * 12/2002 Schlonski et al. ............ 358/1.1
2003/0051069 A1 * 3/2003 Iida .................................. 709/321
2003/0154099 A1 * 8/2003 Tuijn et al. ........................ 705/1
2003/0165138 A1 * 9/2003 Swonk .................. H04L 49/354 370/392

(Continued)

FOREIGN PATENT DOCUMENTS

JP 07-334445 A 12/1995
JP 2002-333800 11/2002

(Continued)

OTHER PUBLICATIONS

Jaehong Park et al., Towards Usage Control Models: Beyond Traditional Access Control, Jun. 3-4, 2002, ACM, pp. 1-8.*

(Continued)

Primary Examiner — Kari Schmidt
Assistant Examiner — Fahimeh Mohammadi
(74) Attorney, Agent, or Firm — Buchanan Ingersoll & Rooney PC

(57) ABSTRACT

A device administration apparatus includes an apparatus information obtainer that obtains via a network, apparatus information stored in a device, a judger that judges whether or not the device is an administration object based on the obtained apparatus information, and an administrator that administers use of the device, if the judger judges that the device is an administration object.

24 Claims, 12 Drawing Sheets

(56) References Cited

U.S. PATENT DOCUMENTS

| | | | |
|---|---|---|---|
| 2004/0073795 A1* | 4/2004 | Jablon | 713/171 |
| 2004/0168079 A1* | 8/2004 | Motoyama et al. | 713/200 |
| 2004/0181696 A1* | 9/2004 | Walker | H04L 63/0846 726/6 |
| 2004/0190052 A1* | 9/2004 | Sando | 358/1.15 |
| 2005/0021520 A1* | 1/2005 | Neilsen | G06F 21/31 |
| 2005/0097199 A1* | 5/2005 | Woodard | H04L 67/125 709/223 |
| 2005/0216466 A1* | 9/2005 | Miyamoto et al. | 707/9 |
| 2005/0243363 A1* | 11/2005 | Muto | 358/1.15 |
| 2005/0273863 A1* | 12/2005 | Nakao | G03G 15/5091 726/26 |
| 2006/0064738 A1* | 3/2006 | Hino | G06F 21/608 726/2 |
| 2006/0123037 A1* | 6/2006 | Takeshita et al. | 707/101 |
| 2006/0206445 A1* | 9/2006 | Andreoli | G06K 9/6226 706/52 |
| 2006/0212497 A1* | 9/2006 | Tomita | 707/205 |
| 2007/0127069 A1* | 6/2007 | Steele et al. | 358/1.16 |
| 2007/0146768 A1* | 6/2007 | Isoda | 358/1.14 |
| 2007/0204045 A1* | 8/2007 | Shima | H04N 1/00233 709/226 |
| 2007/0239610 A1* | 10/2007 | Lemelson | G06Q 10/00 705/51 |
| 2007/0250920 A1* | 10/2007 | Lindsay | G06F 21/31 726/7 |
| 2007/0268509 A1* | 11/2007 | Andreoli | G06F 11/0733 358/1.14 |
| 2007/0294538 A1* | 12/2007 | Lim | G06F 21/46 713/183 |
| 2007/0299905 A1* | 12/2007 | Wanda | 709/201 |
| 2009/0059272 A1* | 3/2009 | Matsushita et al. | 358/1.15 |

FOREIGN PATENT DOCUMENTS

| | | |
|---|---|---|
| JP | 2005-038439 | 2/2005 |
| JP | 2005-157446 | 6/2005 |
| JP | 2006-268138 | 10/2006 |
| JP | 2007-034445 | 2/2007 |
| JP | 2007-323463 | 12/2007 |

OTHER PUBLICATIONS

Guillaume Bouchard et al., Soft Failure Detection using Factorial Hidden Markov Models, Dec. 13-15, 2007, IEEE, pp. 160-165.*

Victor M. González et al., "Constant, Constant, Multi-tasking Craziness": Managing Multiple Working Spheres, Apr. 24-29, 2004, ACM, pp. 113-120.*

Kaoru Kawamoto,Electricity used by office equipment and network equipment in the US, Mar. 2002, ACM, ScienceDirect, vol. 27, Issue 3, pp. 255-269.*

A Notification of Allowance issued in corresponding Japanese Patent Application No. 2007-267261, mailed Nov. 10, 2009, and English translation thereof.

A Notification of Reasons for Refusal issued in corresponding Japanese Patent Application No. 2007-267261, mailed Aug. 11, 2009, and English translation thereof.

* cited by examiner

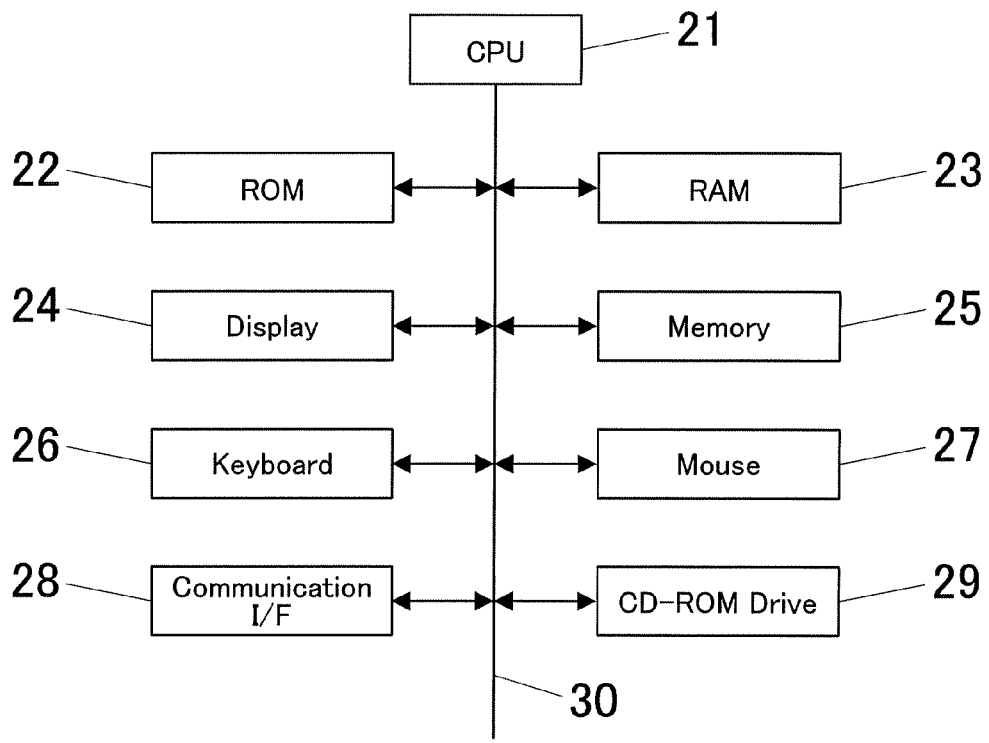

DEVICE ADMINISTRATION APPARATUS, DEVICE ADMINISTRATION METHOD AND RECORDING MEDIUM

This application claims priority under 35 U.S.C. §119 to Japanese Patent Application No. 2007-267261 filed on Oct. 12, 2007, the entire disclosure of which is incorporated herein by reference in its entirety.

BACKGROUND OF THE INVENTION

Field of the Invention

The present invention relates to a device administration apparatus that administers via a network, use of devices such as image forming apparatuses, a device administration method, and a computer readable recording medium storing in itself a device administration program to make a computer execute processing.

Description of the Related Art

The following description sets forth the inventor's knowledge of related art and problems therein and should not be construed as an admission of knowledge in the prior art.

Conventionally, there exits a heretofore known device administration system in which a device administration apparatus connected to a network, easily administers via the network, use of devices such as image forming apparatuses also connected to the network.

In such a device administration system, for example, a device administration apparatus connected to a network collectively administers use of a plurality of image forming apparatuses also connected to the network, such as the number of printed sheets and users who used the image forming apparatuses.

In such a device administration system, another device that is an administration object sometimes happens to be additionally connected to the network. Alternatively, another administration apparatus sometimes happens to be additionally connected to the network, if the current device administration apparatus suffers from overloads due to increase of the devices that are administration objects.

In such a case, it is necessary to make the current administration apparatus recognize the additionally connected device as the device that are administration objects, or to make the additionally connected administration apparatus recognize the devices that are administration objects. However, a system administrator or etc. bothers to manually configure a certain setting in order to make a device administration apparatus recognize devices that are administration objects, which is inconvenient with this conventional device administration system.

Meanwhile, there is an art disclosed in Japanese Unexamined Laid-open Patent Publication No. H07-334445, wherein an agent that administers/controls some of the administered objects existing within a network is provided in the network and those objects are hierarchically administered by this agent.

This art disclosed in the publication is only effective to hierarchically administer some of the administered objects existing within a network by an agent that administers/controls those objects. However, it is not effective to allow a system administrator or etc. to skip the troublesome operation to configure a certain setting in order to make a device administration apparatus recognize devices that are administration objects, when another device or another device administration apparatus is additionally connected to a network.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide a device administration apparatus that allows a system administrator or etc. to skip the troublesome operation to configure a certain setting in order to make a device administration apparatus recognize devices that are administration objects, when another device or another device administration apparatus is additionally connected to a network.

It is another object of the present invention to provide a device administration method that allows a system administrator or etc. to skip the troublesome operation to configure a certain setting in order to make a device administration apparatus recognize devices that are administration objects, when another device or another device administration apparatus is additionally connected to a network.

It is yet another object of the present invention to provide a computer readable recording medium storing in itself a device administration program to make a computer execute processing by the device administration method.

According a first aspect of the present invention, a device administration apparatus includes:
  an apparatus information obtainer that obtains apparatus information stored in a device, via a network;
  a judger that judges whether or not the device is an administration object, based on the obtained apparatus information; and
  an administrator that administers use of the device, if the judger judges that the device is an administration object.

According to a second aspect of the present invention, a device administration method includes:
  obtaining apparatus information stored in a device connected to the network, via a network;
  judging whether or not the device is an administration object, based on the obtained apparatus information; and
  starting administration of use of the device, if it is judged that the device is an administration object.

According to a third aspect of the present invention, a computer readable recording medium storing in itself a device administration program to make a computer execute:
  obtaining apparatus information stored in a device, via a network;
  judging whether or not the device is an administration object, based on the obtained apparatus information; and
  starting administration of use of the device, if it is judged that the device is an administration object.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 3 is a block diagram showing an electrical configuration of a device administration apparatus;

FIG. 4 is a view showing an example of a judgment conditions list;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
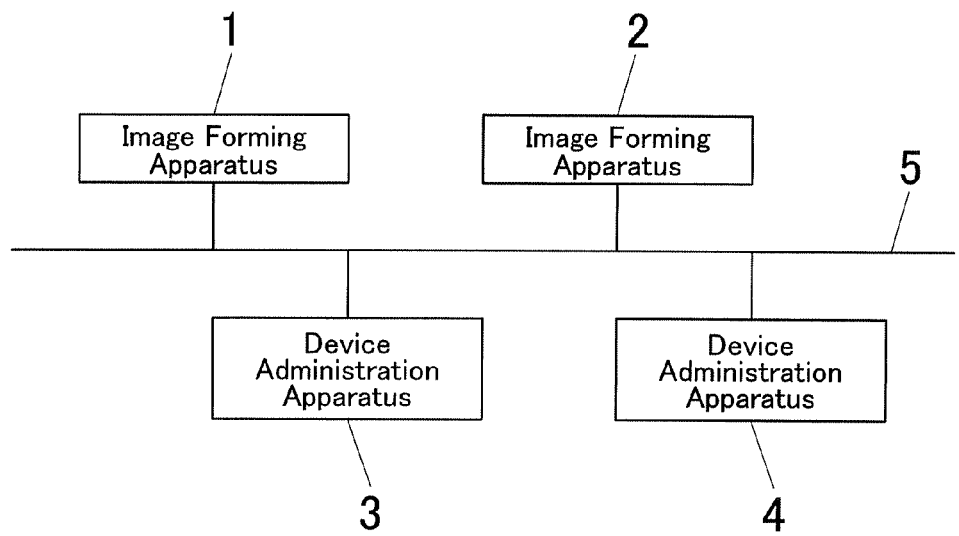
FIG. 1 is a view showing a configuration of a device administration system.

As shown in FIG. 1, a device administration system includes image forming apparatuses 1 and 2 that are devices that are administration objects, and device administration apparatuses 3 and 4 that administer use of the image forming apparatuses 1 and 2, which are interconnected via a network 4 such as a LAN.

The image forming apparatuses 1 and 2 print out image data read out from a document, image data received via the network 5 from an external apparatus or etc., and other image data.

An electrical configuration of the image forming apparatus 1 will be explained with reference to FIG. 2. Since the image forming apparatus 2 has the same electrical configuration as that of the image forming apparatus 1, explanation thereof is omitted.

Figure 2:
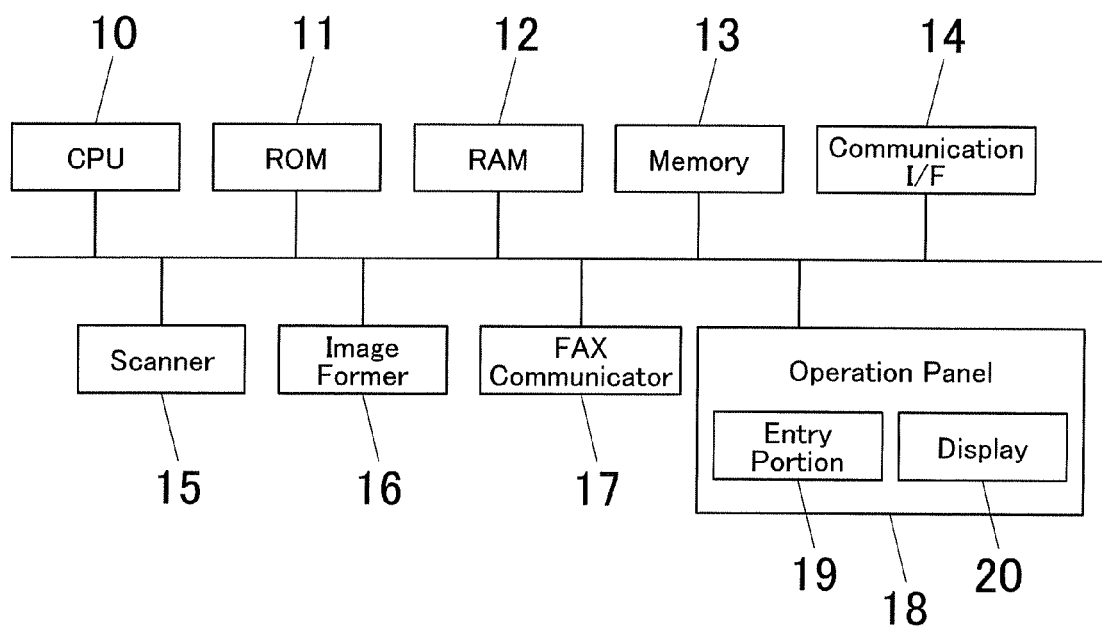
FIG. 2 is a block diagram showing an electrical configuration of an image forming apparatus.

As shown in FIG. 2, the image forming apparatus 1 includes a CPU 10, a ROM 11, a RAM 12, a memory 13, a communication interface (communication I/F) 14, a scanner 15, an image former 16, a FAX communicator 17, an operation panel 18 and etc.

The CPU 10 centrally controls the entire image forming apparatus 1, by executing a program stored in the ROM 11.

The ROM 11 stores in itself a program executed by the CPU 10 and other data.

The RAM 12 provides an operation area for the CPU 10 to execute a program, and temporarily stores in itself a program, data used for executing a program, and other data.

The memory 13 is a recording medium such as a hard disk drive, and stores in itself image data read out from a document by the scanner 15, various programs and other data. In this embodiment, it stores usage log of users who used the image forming apparatus, a shared password, a unique password and etc. A shared password is commonly used among all the apparatuses connected to the network 5, and if a shared password is set on the image forming apparatus 1, the device administration apparatus 3 and 4 are allowed to freely access the image forming apparatus 1. On the other hand, a unique password is used to allow a particular device administration apparatus that is the device administration apparatus 3 or 4, to access the image forming apparatus 1. For example, a device administration apparatus generates a unique password and transmits the unique password and also an instruction to change the shared password to the unique password, to an image forming apparatus that is a device that is an administration object. And then, the unique password is set on the image forming apparatus accordingly. In this case, only the device administration apparatus giving an instruction to change the shared password to the unique password is allowed to access the image forming apparatus receiving this instruction. To prevent from generating doubled unique passwords, each of the device administration apparatus 3 and 4 can generate a unique password based on its own MAC address or IP address. Alternatively, a unique password can be generated in another manner.

The communication interface (I/F) 14 functions as a communicator that exchanges with the device administration apparatuses 3 and 4, apparatus information including usage log, and a shared password, a unique password and etc., via the network 5.

The scanner 15 includes a CCD sensor and etc., and reads an image on a document that is placed by a user on a platen glass or an automatic document feeder (neither of them is not shown in Figures) then converts it to image data.

The image former 16 prints on a sheet, image data read out from a document by the scanner 15, image data transmitted from an external apparatus and other image data.

The FAX communicator 17 functions as a communicator that exchanges image data via a telephone circuit.

The operation panel 18 is used by users to perform entry operations, and shows them messages including a notice of job completion, various screens and etc. The operation panel 18 includes an entry portion 19 collectively having a plurality of keys such as numeric keys and a start key, and a display 20 such as a touch-panel liquid crystal display displaying on itself a mode setting screen, messages and etc.

The device administration apparatuses 3 and 4 are personal computers (hereinafter to be referred to as "PCs").

An electrical configuration of the device administration apparatus 3 will be explained with reference to FIG. 3. Since the device administration apparatus 4 has the same electrical configuration as that of the device administration apparatus 3, explanation thereof is omitted.

As shown in FIG. 3, a ROM 22, a RAM 23, a display 24, a memory 25, a keyboard 26, a mouse 27, a communication interface (communication I/F) 28 and a CD-ROM drive 29 are connected to a bus line extended from a CPU 21.

The CPU 21 centrally controls the entire device administration apparatus 3. For example, in this embodiment, the CPU 21 judges whether or not a connected image forming apparatus is the device that is an administration object of the device administration apparatus 3, based on usage log included in apparatus information that is obtained from the image forming apparatuses 1 and 2, and conditions about usage log (hereinafter to be referred to as "judgment conditions"), which are registered in a database of the memory 25. Further, if detects an image forming apparatus connected to the network 5 or judges the connected image forming apparatus as an administration object, the CPU 21 configures a setting to administer the image forming apparatus and administers use of the image forming apparatus. Detailed explanation will be provided later.

The ROM 22 stores in itself an operation program for the CPU 21 and other data.

The RAM 23 provides an operation area for the CPU 21 to execute processing according to an operation program.

The display 24 is a liquid crystal display, a CRT or etc., and displays on itself various messages, various screens for users such as an entry reception screen and a selection screen, and documents created by users, and etc.

The memory 25 is a recording medium such as a hard disk drive, and stores in itself data and various information. In this embodiment, the memory 25 stores information about users, which includes user names, information about sections, and also a database to register the judgment conditions, as mentioned above. Further, the memory 25 stores data to administer use of the image forming apparatuses that are the devices that are administration objects. For example, the data is the number of executed jobs, the number of printed sheets and the number of sheets printed in full colors and monochrome, and is organized therein by the registered user names and sections. The data can be updated.

Later, judgment conditions will be explained in details.

The keyboard 26 and the mouse 27 are used by users to perform entry operations.

The communication interface (communication I/F) 28 functions as a communicator that exchanges data with the image forming apparatuses 1 and 2 via the network 5. In this embodiment, under the control of the CPU 21, the communication interface 28 obtains apparatus information including usage log, which is stored in the image forming apparatuses 1 and 2, and exchanges a shared password, a unique password and etc.

The CD-ROM drive 29 drives a CD-ROM.

Hereinafter, judgment conditions will be explained with reference to FIG. 4 as mentioned above.

Judgment conditions are used as criteria for judgment whether or not the image forming apparatus 1 and 2 connected to the network 5 are the devices that are administration objects. Based on the judgment conditions and usage log included in apparatus information obtained from an image forming apparatus connected to the network 5, it is judged whether or not the image forming apparatus is the devices that is an administration object.

A judgment conditions list 40 of FIG. 4 (A) is registered in a database of the memory 25 of the device administration apparatus 3, and wherein judgment conditions are organized by users, for example.

The judgment conditions list 40 contains user names and the number of job instructions issued by users. In this embodiment, the number of job instructions issued by User A is set to "20 and more", and under this condition, the device administration apparatuses 3 and 4 judge the image forming apparatuses 1 and 2 as the devices that are administration objects. Similarly, the number of job instructions issued by User B, User C, User D, User E and User F is set to "25 and more", "20 and more", "25 and more", "40 and more" and "90 and more", respectively.

The usage log obtained from the image forming apparatus 1 and 2 are compared to the numbers and if at least one of Users A, B, C, D, E and F, satisfy their conditions, then the device administration apparatus 3 and 4 judge the image forming apparatus 1 and 2 as the devices that are administration objects.

On the other hand, according to the judgment conditions list 41 shown in FIG. 4 (B), no judgment conditions are set for Users A, B and C. This means, even if the obtained usage log include those of User A, B and/or C, the device administration apparatus 3 and 4 do not use the usage log for judgment whether or not the image forming apparatus 1 and 2 are administration objects.

Judgment conditions are not limited to those mentioned above, and also can be the number of job instructions issued by sections.

Further, in this embodiment, the number of job instructions is set for the respective users registered in the judgment conditions list. Alternatively, it also can be configured such that a device administration apparatus judges an image forming apparatus as the device that is an administration object, if the users have used the image forming apparatus even once. However, in this case, if any of the users registered in the judgment conditions list temporarily uses a different image forming apparatus far from his/her office due to a business trip, a device administration apparatus judges the image forming apparatus as the device that is an administration object, which is inconvenient. In order to eliminate such an inconvenience, it is favorable that the number of job instructions is set for the users.

Hereinafter, operations of the device administration apparatus 3 will be explained with reference to FIG. 5 through FIG. 10.

Figure 5:
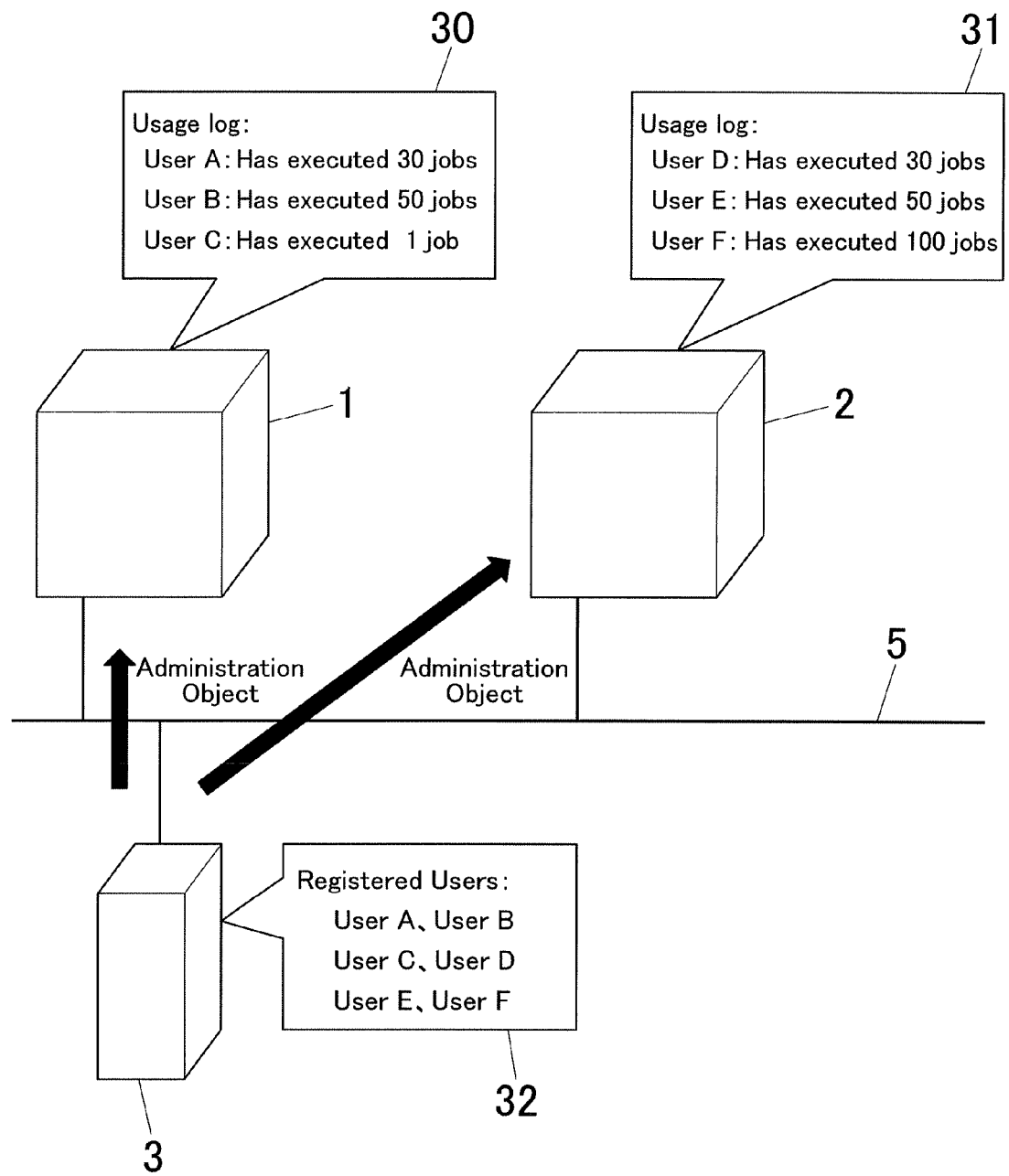
FIG. 5 is a view to explain operations of the device administration apparatus.

As shown in FIG. 5, the device administration apparatus 3 is connected to the network 5, to administer the image forming apparatuses 1 and 2 also connected to the network 5.

The usage log 30 of User A, B and C is stored in the memory 13 of the image forming apparatus 1, and the usage log 31 of User D, E and F is stored in the memory 13 of the image forming apparatus 2. Meanwhile, the judgment conditions list 40 of FIG. 4 (A) is registered in a database 32 of the memory 25 of the device administration apparatus 3. Further, a shared password used among all the apparatuses connected to the network is set on the image forming apparatuses 1 and 2, and by using the shared password, the device administration apparatus 3 is allowed to freely access the image forming apparatuses 1 and 2.

Initially, the device administration apparatus 3 accesses the image forming apparatus 1 by using the shared password. And apparatus information including the usage log 30 stored in the image forming apparatus 1 is obtained via the network 5, and the obtained usage log 30 is compared to the judgment conditions registered in the judgment conditions list 40. And then, it is judged whether or not at least one of Users A, B, C, D, E and F, satisfy their judgment conditions.

In this embodiment, Users A and B satisfy their judgment conditions. Therefore, the device administration apparatus 3 judges the image forming apparatus 1 as the device that is an administration object. After the judgment, the device administration apparatus 3 transmits an instruction to change the shared password to a unique password, to the image forming apparatus 1. Receiving this instruction, the image forming apparatus 1 changes the shared password to a unique password, accordingly.

Meanwhile, the device administration apparatus 3 also accesses the image forming apparatus 2 by using the shared password. And apparatus information including the usage log 31 stored in the image forming apparatus 2 is obtained via the network 5, and the obtained usage log 31 is compared to the judgment conditions registered in the judgment conditions list 40. And then, it is judged whether or not at least one of Users A, B, C, D, E and F, satisfy their judgment conditions.

In this embodiment, Users D, E and F satisfy their judgment conditions. Therefore, the device administration apparatus 3 judges the image forming apparatus 2 as the device that is an administration object. After the judgment, the device administration apparatus 3 transmits an instruction to change the shared password to a unique password, to the image forming apparatus 2. Receiving this instruction, the image forming apparatus 2 changes the shared password to a unique password, accordingly.

After judging the image forming apparatuses 1 and 2 as the devices that are administration objects, the device administration apparatus 3 is allowed to access on a regular or irregular basis, the image forming apparatuses 1 and 2 by using the unique passwords, in order to obtain apparatus information such as usage log. Then, the number of printed sheets for example, is registered in the database and organized by users or sections, based on which the device administration apparatus 3 collectively administers use of the image forming apparatuses 1 and 2.

As described above in this embodiment, without a troublesome operation by a system administrator or etc., the image forming apparatuses 1 and 2 are automatically judged as the devices that are administration objects by the device administration apparatus 3. Thus, it is advantageous that a system administrator or etc. is allowed to skip the troublesome operation to configure a certain setting in order to make a device administration apparatus recognize devices that are administration objects.

Further, in this embodiment, a usage log obtained from an image forming apparatus is compared to judgment conditions registered in a device administration apparatus, and it is judged from the comparison whether or not the image forming apparatus is an administration object. Thus, this judgment is performed easily and properly.

Further, in this embodiment, an instruction to change a shared password to a unique password is given to an image forming apparatus that is judged as the device that is an administration object, and the image forming apparatus changes the password, accordingly. And by using the unique password (the changed password), the device administration apparatus 3 is allowed to freely access the image forming apparatuses 1 and 2.

Figure 6:
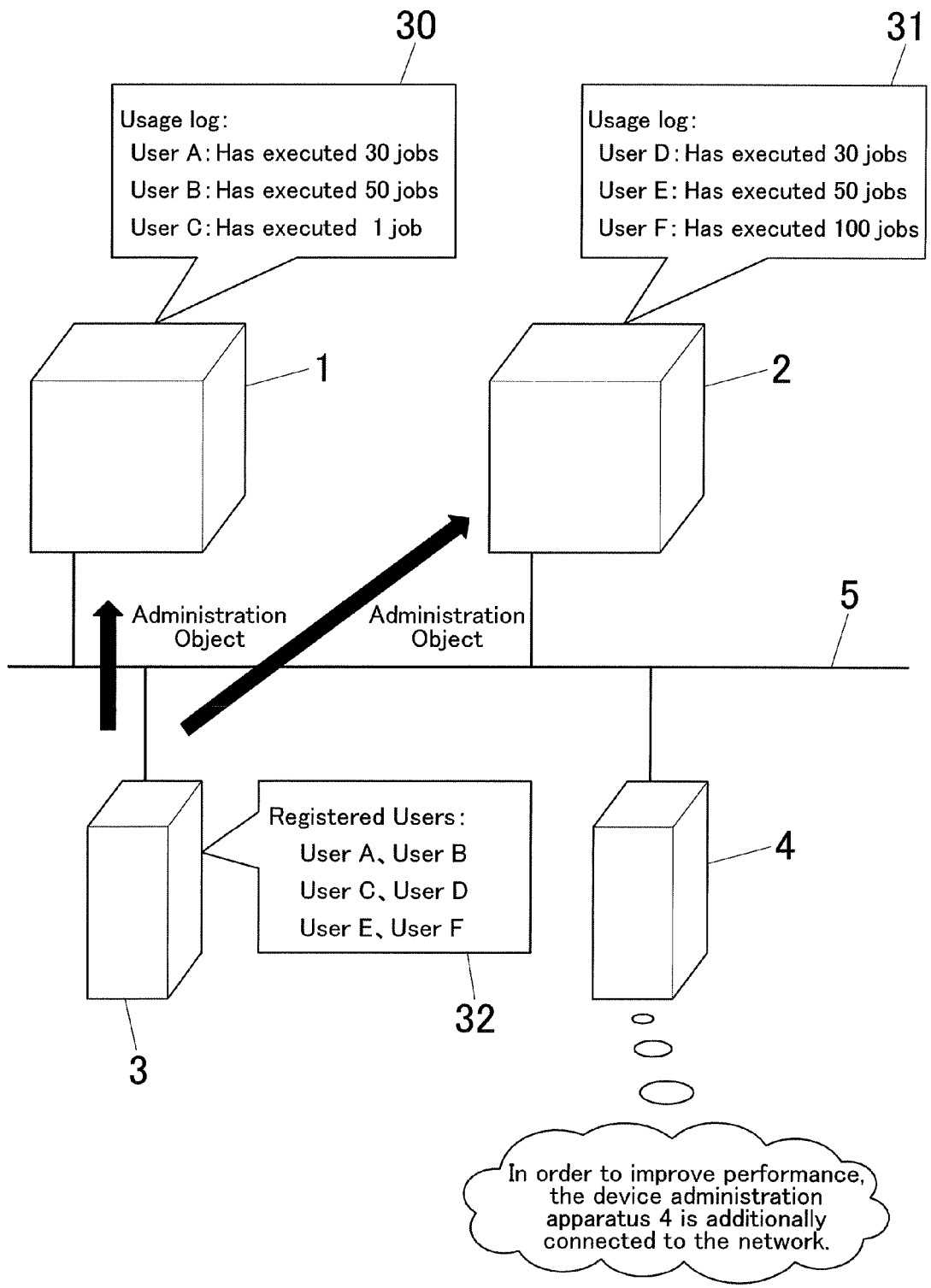
FIG. 6 is a view continued from FIG. 5.
Figure 7:
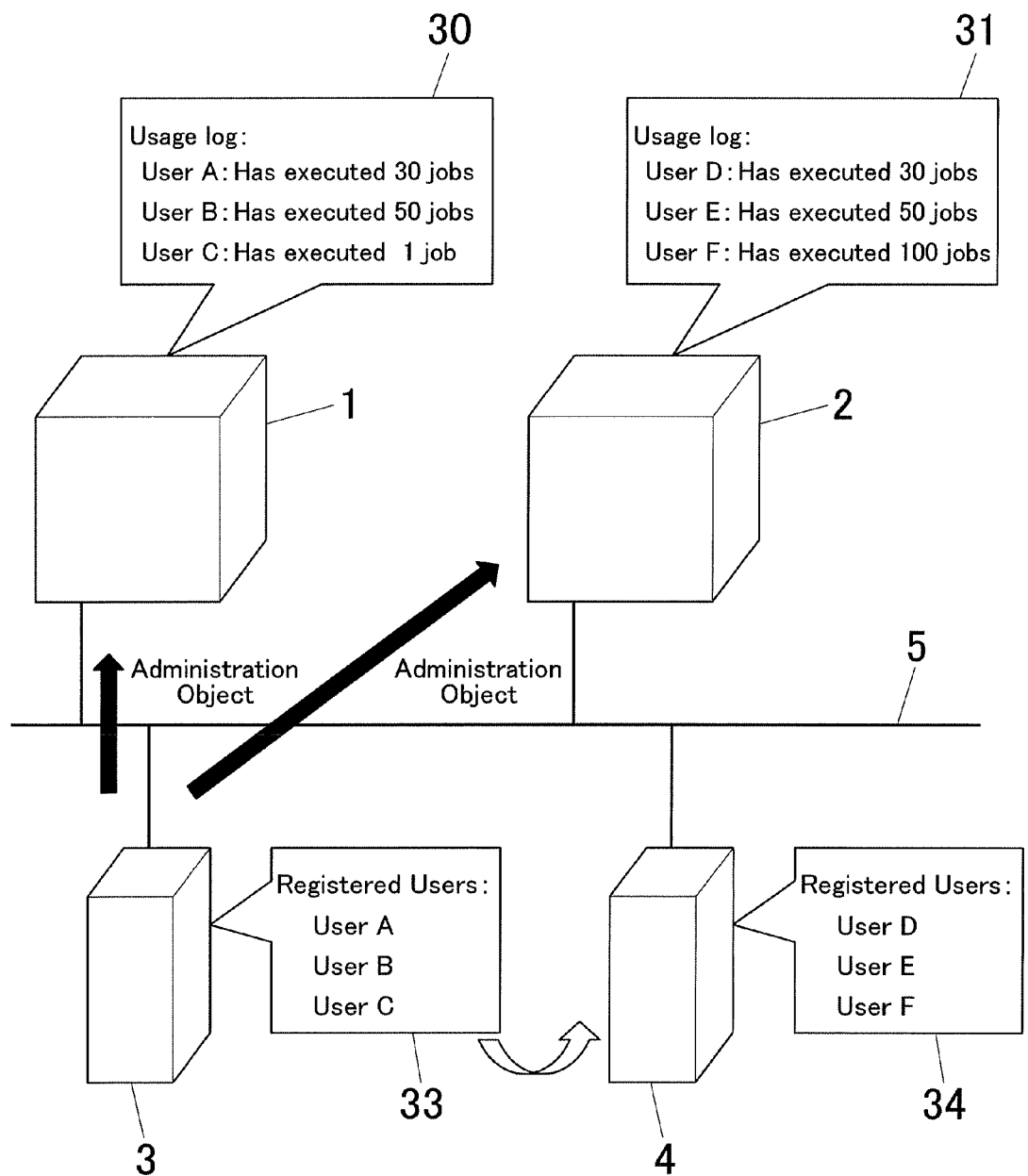
FIG. 7 is a view continued from FIG. 6.

Hereinafter, an example will be explained with reference to FIG. 6, in which a system administrator or etc. intends to additionally connect a device administration apparatus 4 to the network 5 in order to improve performance, if the device administration apparatus 3 suffers from overloads due to increase of data needed to be administered. Specifically, as shown in FIG. 7, a system administrator or etc. removes the data of Users D, E and F from the database 33 of the device administration apparatus 3 and registers that data again in a database 34 of the device administration apparatus 4, in order to make the additionally connected device administration apparatus 4 administer Users D, E and F's use of the image forming apparatus 2. More specifically, he/she removes the judgment conditions set for Users D, E and F from the judgment conditions list 40 stored in the database 33 of the memory 25 of the device administration apparatus 3 and registers those judgment conditions again in the judgment conditions list 41 (shown in FIG. 4 (B)) stored in the database 34 of the memory 25 of the device administration apparatus 4.

Figure 8:
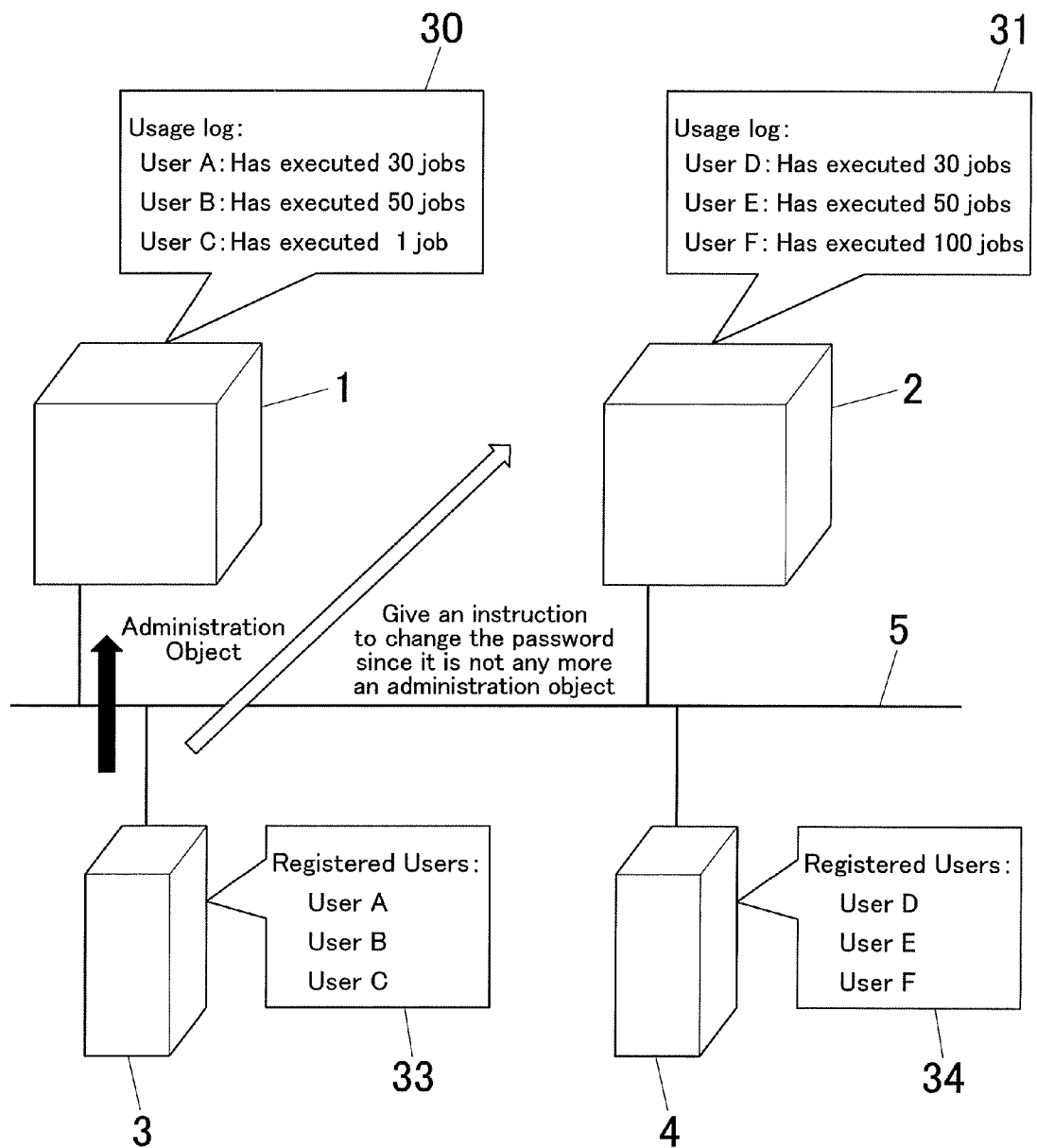
FIG. 8 is a view continued from FIG. 7.

When the judgment conditions set for Users D, E and F are removed from the list, the device administration apparatus 3 obtains usage log from the image forming apparatuses 1 and 2 and compares them to the judgment conditions, in order to identify image forming apparatuses used by these users. Then the device administration apparatus 3 judges from the comparison result that the image forming apparatus 2 is used by Users D, E and F, and this means that the image forming apparatus 2 is no more the device that is an administration object. And as shown in FIG. 8, the device administration apparatus 3 gives an instruction to change the unique password to the shared password, to the image forming apparatus 2. Changing the unique password to the shared password allows the device administration apparatus 4 to access the image forming apparatus 2.

Meanwhile, the device administration apparatus 4 tries to access the image forming apparatuses 1 and 2 by using the shared password, in order to obtain apparatus information including their usage log.

Although, the device administration apparatus 4 is not allowed to access the image forming apparatus 1, since the image forming apparatus 1 is still a device that is an administration object by the device administration apparatus 3 and the unique password is set thereon.

On the other hand, the device administration apparatus 4 is allowed to access the image forming apparatus 2, since the image forming apparatus 2 changed the unique password to the shared password according to the instruction given by the device administration apparatus 3. Thus, the device administration apparatus 4 obtains the usage log 31.

Subsequently, the device administration apparatus 4 compares the obtained usage log 31 to the judgment conditions list 41 stored in the database of the memory 25, and judges from the comparison result that the image forming apparatus 2 as the device that is an administration object.

Figure 9:
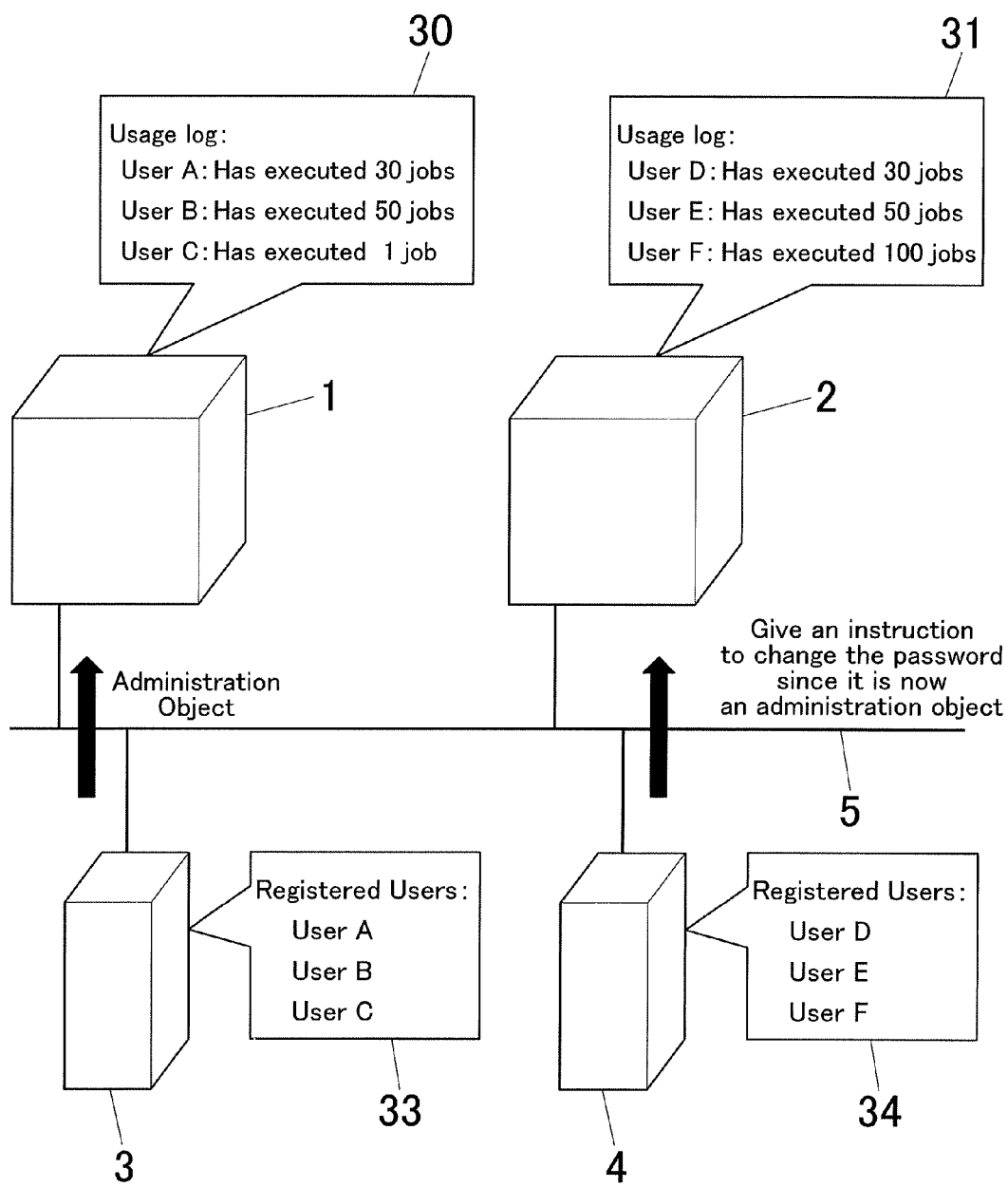
FIG. 9 is a view continued from FIG. 8.

Continuing to FIG. 9, the device administration apparatus 4 gives an instruction to change the shared password to the unique password, to the image forming apparatus 2. Receiving this instruction, the image forming apparatus 2 changes the shared password to the unique password, accordingly.

Figure 10:
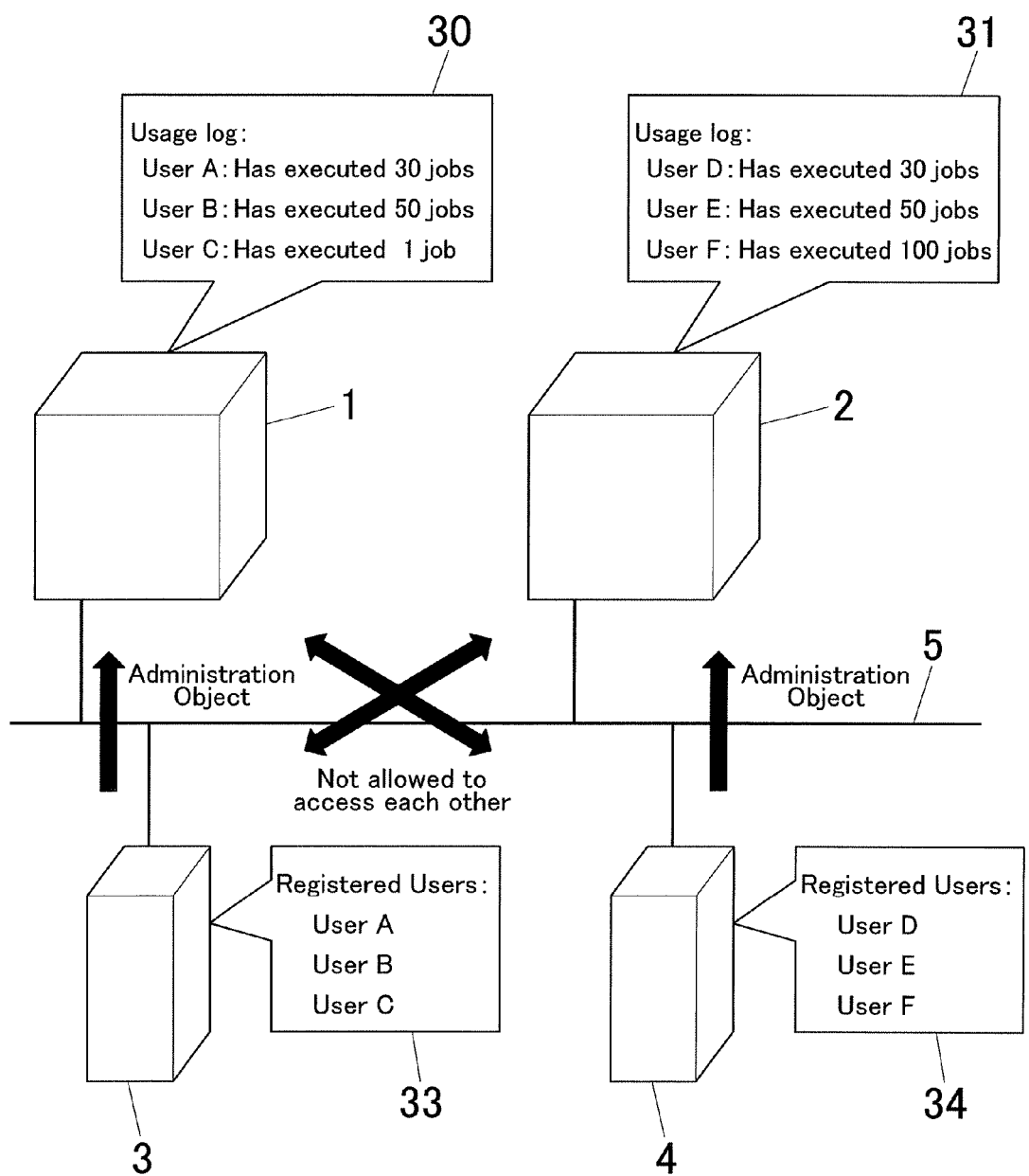
FIG. 10 is a view continued from FIG. 9.

After completing these operations above, the device administration apparatus 3 recognizes the image forming apparatus 1 as the device that is an administration object, and the device administration apparatus 4 recognizes the image forming apparatus 2 as the device that is an administration object, as shown in FIG. 10. Further, since the shared password is changed to the unique password, the device administration apparatus 3 is not allowed to access the image forming apparatus 2 and the device administration apparatus 4 is not allowed to access the image forming apparatus 1. After that, the device administration apparatus 3 obtains apparatus information including usage log of the image forming apparatus 1 therefrom and the device administration apparatus 4 obtains apparatus information including usage log of the image forming apparatus 2, exclusively and on a regular or an irregular basis, the device administration apparatuses 3 and 4 update the number of sheets printed by users or sections, based on the obtained information. Thus, the device administration apparatuses 3 and 4 take the roles to administer use of the image forming apparatuses 1 and 2, respectively.

As described above in this embodiment, a system administrator or etc. is allowed to skip the troublesome operation to configure a certain setting to identify devices that are administration objects and he/she simply changes the judgment conditions, when another device administration apparatus is additionally connected to the network. That is very convenient.

Figure 11:
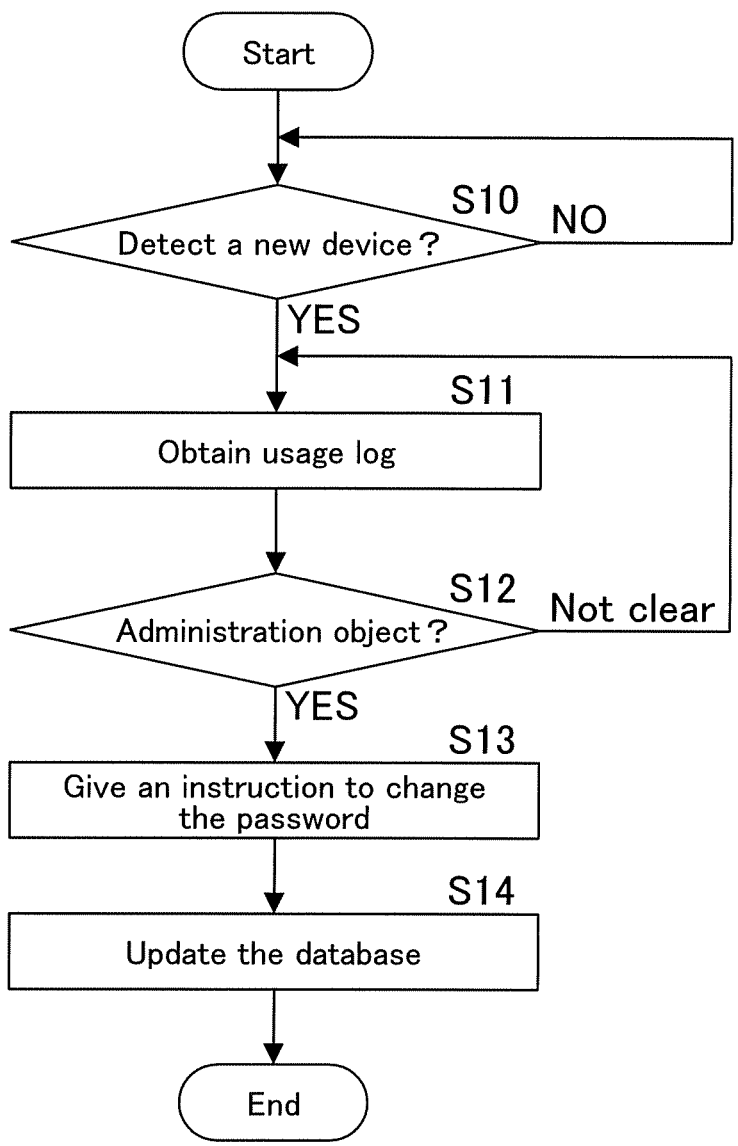
FIG. 11 is a flowchart showing a procedure executed in the device administration apparatus.

Hereinafter, a procedure executed in the device administration apparatus 3 or 4 will be explained with reference to a flowchart FIG. 11, and the procedure starts when the device administration apparatus detects that the image forming apparatus 1 or 2 is connected to the network 5 and terminates when the device administration apparatus takes the roles to administer the image forming apparatus. This procedure is executed by the CPU 21 according to a program stored in a recording medium such as the ROM 22.

Initially, a system administrator or etc. connects an image forming apparatus or a device administration apparatus to the network 5. Then it is judged whether or not an image forming apparatus is connected to the network 5 (Step S10). If an image forming apparatus is not connected (NO in Step S10), the routine waits until it is connected. If an image forming apparatus is connected (YES in Step S10), an access to the connected image forming apparatus is made by using a shared password and apparatus information including a usage log is obtained from the image forming apparatus (Step S11).

Subsequently, the obtained usage log is compared to the judgment conditions of the judgment conditions list 40 or 41 registered in the database of the memory 25, which is shown in FIG. 4, and it is judged from the comparison result whether or not the image forming apparatus is the device that is an administration object (Step S12).

If that judgment could not be made ("Not clear" in Step S12), the routine returns to Step S11 and repeats S11 and S12 on a regular basis until that judgment is made.

Specifically, for example, if the usage log obtained from the image forming apparatus does not include data of users registered in the judgment conditions list 40 or 41, and if the usage log includes that data but some of the users do not satisfy their judgment conditions registered in the judgment conditions list 40 or 41, the processes of obtaining the usage log and making that judgment are repeatedly performed. Just like such cases described above, if that judgment whether or not the image forming apparatus is the device that is an administration object, could not be made, the processes of obtaining the usage log from the image forming apparatus and making that judgment are repeatedly performed until the obtained usage log is usable enough for that judgment. Thus, even if the usage log accumulated in the image forming apparatus is not usable enough for that judgment, the processes are automatically performed without problem.

On the other hand, if it is judged that the image forming apparatus is the device that is an administration object (YES in Step S12), the device administration apparatus generates a unique password in order to prevent the other device administration apparatus from accessing or changing the information stored in the image forming apparatus that is judged as the device that is an administration object, and transmits the generated unique password and an instruction to change the shared password to this unique password, to the image forming apparatus (Step S13). And the unique password and apparatus information of the image forming apparatus that is judged as the device that is an administration object are registered in the database of the memory 25, and thereby the device administration apparatus starts administration of the image forming apparatus (Step S14). Then the routine terminates.

Figure 12:
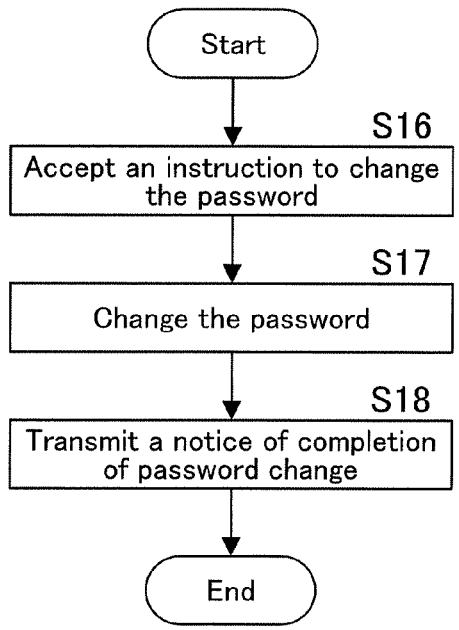
FIG. 12 is a flowchart showing a procedure executed in the image forming apparatus.

Hereinafter, a procedure executed in the image forming apparatus when receives from the device administration apparatus an instruction to change the password, will be explained with reference to a flowchart shown in FIG. 12. This procedure is executed by the CPU 10 according to a program stored in a recording medium such as the ROM 11.

The device administration apparatus gives an instruction to change the password, then this instruction is accepted (Step S16). The shared password is changed to a unique password (Step S17), and a notice of completion of password change is transmitted to the device administration apparatus (Step S18). Then the routine terminates.

Figure 13:
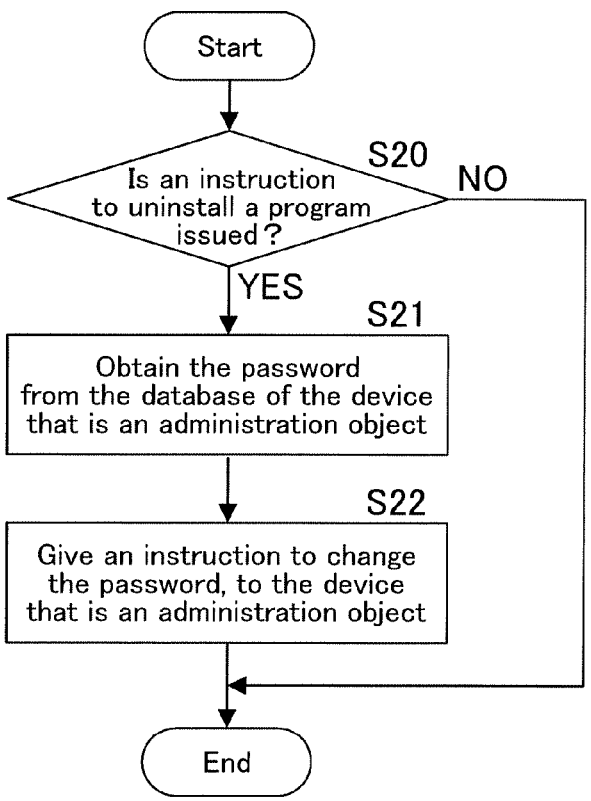
FIG. 13 is a flowchart showing a procedure executed in the device administration apparatus when an administration program is uninstalled.

Hereinafter, a procedure executed in the device administration apparatus, when a system administrator or etc. uninstalls an administration program installed in a recording medium such as the ROM 22 and thereby the device administration apparatus's function to administer the image forming apparatus that is an administration object, is disabled, will be explained with reference to a flowchart shown in FIG. 13. This procedure is executed by the CPU 21 according to a program stored in a recording medium such as the ROM 22.

It is judged whether or not a system administrator or etc. issues an instruction to uninstall an administration program (Step S20). If he/she does not issue such an instruction (NO in Step S20), the routine immediately terminates.

If he/she issues such an instruction, the password (the shared password) of the currently-administered image forming apparatus is obtained from the database of the memory 25 (Step S21), and the shared password and an instruction to turn the unique password back to the shared password is given to the image forming apparatus in order to allow the other device administration apparatus to access the image forming apparatus (Step S22). Then the routine terminates.

Figure 14:
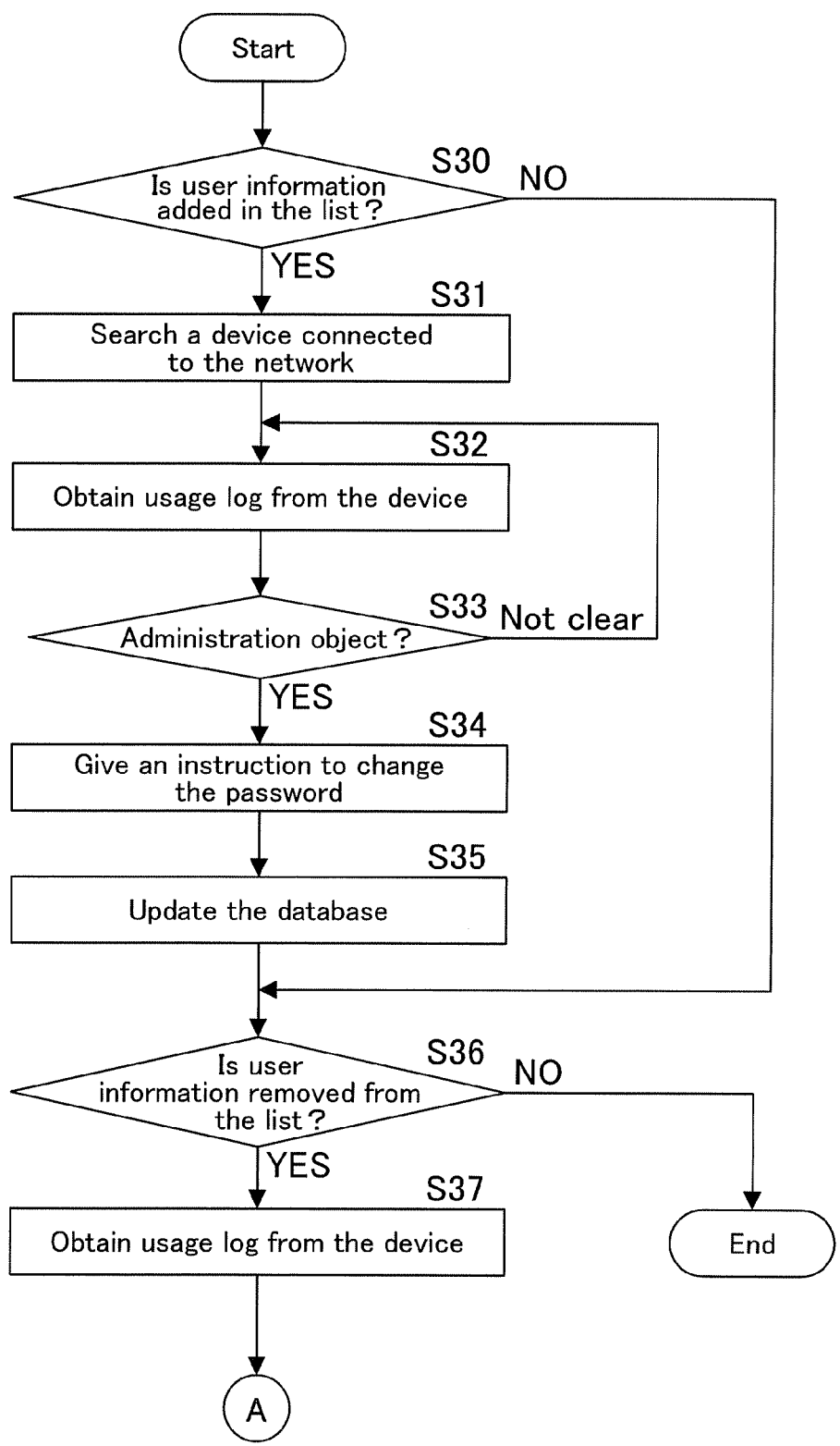
FIG. 14 is a flowchart showing a procedure executed in the device administration apparatus when a user is added into the judgment conditions list or when a user is removed from the judgment conditions list.
Figure 15:
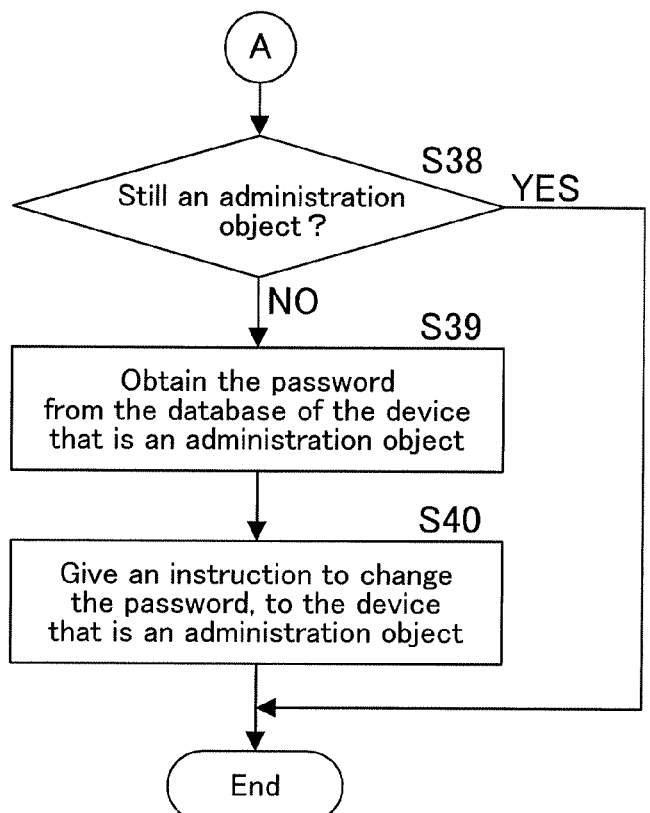
FIG. 15 is a flowchart continued from FIG. 14.

Hereinafter, a procedure executed in the device administration apparatus 3 or 4 when a user is newly added in the judgment conditions list 40 or 41 and when a user is removed from the judgment conditions list 40 or 41 of the device administration apparatus 3 or 4, will be explained with flowcharts shown in FIG. 14 and FIG. 15. This procedure is executed by the CPU 21 according to a program stored in a recording medium such as the ROM 22.

Initially, it is judged whether or not a new user is added in the judgment conditions list (Step S30). If no user is newly added (NO in Step S30), the routine proceeds to Step S36 in which it is judged whether or not a user is removed from the list, as to be further described later. If no user is added or removed (NO in Step S36), the routine terminates.

On the other hand, if a name of a new user and a judgment condition for this user are added into the judgment conditions list, by a system administrator or etc. (YES in Step S30), an access to an image forming apparatus connected to the network 5 is made by using the shared password (Step S31). As long as the image forming apparatus used by this new user is connected to the network 5, an access to the image forming apparatus is successfully made by using the shared password, and thereby apparatus information including the usage log is obtained from the image forming apparatus (Step S32).

Subsequently, the obtained usage log of the new user is compared to his/her judgment condition, and it is judged whether or not the image forming apparatus is the device that is an administration object (Step S33). If that judgment cannot be made ("Not clear" in Step S33), the routine returns to Step S32 and the processes of obtaining the apparatus information and making that judgment are repeatedly performed.

If it is judged that the image forming apparatus is the device that is an administration object (YES in Step S33), an instruction to change the shared password to a unique password is given to the image forming apparatus in order to prevent the other device administration apparatus from accessing the image forming apparatus (Step S34). Then, the unique password is registered in the database, thereby the database is updated (Step S35).

Then, it is judged whether or not information of a user is removed from the judgment conditions list (Step S36). If no user is removed (NO in Step S36), the routine terminates. If a user is removed (YES in Step S36), apparatus information including the usage log is obtained from the image forming apparatus that is currently administered (Step S37), and it is judged whether or not the image forming apparatus is still the device that is an administration object (Step S38). If more than one users are preliminarily registered in the list and one of them is removed from the list, then it is still judged that the image forming apparatus is the device that is an administration object as long as the users other than that removed user satisfy their judgment conditions of the judgment conditions list 40.

If it is judged that the image forming apparatus is still the device that is an administration object (YES in Step S38), the routine terminates. If it is judged that the image forming apparatus is not the device that is an administration object any more (NO in Step S38), now the device administration apparatus does not have to administer the image forming apparatus, and thus the shared password is obtained from the database of the image forming apparatus (Step S39), and an instruction to turn the unique password back to the shared password is given to the image forming apparatus, in order to allow the other device administration apparatus to access the image forming apparatus (Step S40). Then the routine terminates.

Meanwhile, when a system administrator or etc. issues an instruction or when the device administration apparatus 3 or 4 suffers from overloads, due to expansion of the network administration system, the administration roles can be automatically transferred (left) to the other device administration apparatus. For example, the roles to administer use of just some of the users can be transferred to the other device administration apparatus, or the roles to administer use about just some of the functions of the image forming apparatuses of 1 and 2 can be transferred to the other device administration apparatus.

Figure 16:
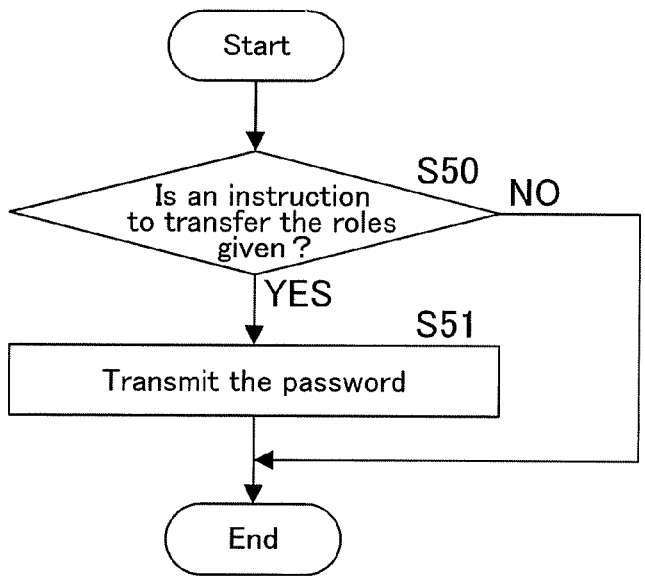
FIG. 16 is a flowchart executed in the device administration apparatus to transfer some of the administration roles to a different device administration apparatus.

Hereinafter, a procedure executed in a device administration apparatus to transfer all or some of the roles to administer devices, to the other device administration apparatus, will be explained with reference to a flowchart shown in FIG. 16. This procedure is executed by the CPU 21 according to a program stored in a recording medium such as the ROM 22.

Initially, it is judged whether or not an instruction to transfer the administration roles is given (Step S50). If such an instruction is not given (NO in Step S50), the routine terminates. If such an instruction is given (YES in Step S50), a unique password allowing access to an image forming apparatus that is an administration object, is transmitted to a device administration apparatus that is specified by a system administrator or etc. or determined in advance (Step S51). Then the routine terminates.

As described above in this embodiment, when a device administration apparatus transfers to a different device administration apparatus, all or some of the roles to administer an image forming apparatus that is an administration object, the device administration apparatus transmits to the different device administration apparatus a password allowing access to the image forming apparatus, and thereby the different administration apparatus is allowed to access the image forming apparatus. Thus, the different device administration apparatus smoothly takes over the roles to administer use of the image forming apparatus.

Further, it can be also configured such that apparatus information of the image forming apparatus after transmitting the password is compared to the one used to be before transmitting the password, and if it is judged that some of the apparatus information is changed and the changed part is other than the administration roles transferred to the different device administration apparatus, it is turned back to the one used to be.

All described above relates to one embodiment of the present invention. However, the present invention is not limited to this embodiment.

For example in this embodiment, it is judged whether or not an image forming apparatus is an administration object, based on a judgment condition corresponding to a usage log (job log) of users. However, the present invention is not limited to this embodiment, and if the image forming apparatus 1 or 2 satisfies a specific condition, for example the image forming apparatus 1 or 2 prints out more than one thousand sheets in full colors every month, the image forming apparatus can be judged as the device that is an administration object.

Further, the unique passwords once set on an image forming apparatus can be changed. For example, it can be also configured such that the device administration apparatuses 3 and 4 generate a unique password and also give an instruction to change the current unique password to the generated unique password, to the image forming apparatuses 1 and 2 that are administration objects, on a regular basis.

Further, in this embodiment, the device administration apparatuses 3 and 4 internally have the databases to administer use of the image forming apparatuses 1 and 2, and thereby directly administer the image forming apparatuses 1 and 2. However, it can be also configured such that the device administration apparatuses 3 and 4 externally have an apparatus such as an external server for storing the apparatus information obtained from the image forming apparatuses 1 and 2, and thereby indirectly administer the image forming apparatuses 1 and 2.

SUMMARY OF THE EMBODIMENT

This embodiment of the present invention includes the following device administration apparatus, device administration method and recording medium.

(1) A device administration apparatus comprising:
an apparatus information obtainer that obtains apparatus information stored in a device, via a network;
a judger that judges whether or not the device is an administration object, based on the obtained apparatus information; and
an administrator that administers use of the device, if the judger judges that the device is an administration object.

With this device administration apparatus, apparatus information stored in a device is obtained via a network, and it is judged based on the obtained apparatus information whether or not the device is an administration object, and then if it is judged that the device is an administration object, use of the device is administered. In other words, it is automatically judged whether or not the device is an administration object, and if it is judged that the device is an administration object, administration of the use is automatically started. Thus, it is advantageous that a system administrator or etc. is allowed to skip the troublesome operation to configure a certain setting in order to make a device administration apparatus recognize devices that are administration objects.

(2) The device administration apparatus also can be configured to further include:

a storage that stores information about conditions to judge whether or not the device is an administration object, based on apparatus information of the device, and wherein:

the judger judges whether or not the device is an administration object, based on the result of comparing the apparatus information obtained by the apparatus information obtainer, to the information about conditions, which is stored in the storage.

With this device administration apparatus, apparatus information obtained from a device is compared to information about conditions to judge whether or not the device is an administration object, based on the apparatus information of the device. And it is judged based on a comparison result whether or not the device is an administration object. Thus, the judgment whether or not the device is an administration object is performed easily and properly.

(3) The device administration apparatus also can be configured such that the apparatus information and the information about conditions correspond to usage log of the device.

With this device administration apparatus, it is judged based on the information about usage log of the device, whether or not the device is an administration object.

(4) The device administration apparatus also can be configured such that if the usage log stored in the device is not usable enough for the judger to judge whether or not the device is an administration object, then the judger repeatedly performs that judgment until the usage log stored in the device becomes usable enough for the judger.

With this device administration apparatus, if the usage log stored in the device is not usable enough to judge whether or not the device is an administration object, that judgment is repeatedly performed until the usage log stored in the device becomes usable enough. Thus, it is advantageous that no troublesome operation is needed until a usage log stored in a device is accumulated enough, even if it is too little.

(5) The device administration apparatus also can be configured to further include an instructor that gives to the device an instruction to change the current password to a password allowing access to the device, if the judger judges that the device is an administration object.

With this device administration apparatus, an instruction to change the current password is given to the device that is judged as an administration object, and the device changes the password accordingly. After that, by using the changed password, only the device administration apparatus taking the roles to administer the device is allowed to access the device.

(6) The device administration apparatus also can be configured such that if a user disables the administrator's function to administer the device or the judger judges that the device is not any more an administration object, while the administrator administers the device, then the instructor gives to the device an instruction to turn the changed password back to the one used to be.

With this device administration apparatus, if a user disables the administrator's function to administer the device or it is judged that the device is not any more an administration object, while the administrator administers the device, then an instruction to turn the changed password back to the one used to be is transmitted to the device. And accordingly, the device turns the changed password back to the one used to be. Thus, a different device administration apparatus is allowed to access the device.

(7) The device administration apparatus can be also configured to further include a notifier that transmits to a different device administration apparatus a password allowing access to the device that is an administration object, if the different device administration apparatus is going to take over all or some of the roles to administer the device.

With this device administration apparatus, if a different device administration apparatus is going to take over all or some of the roles to administer the device, a password allowing access to the device that is an administration object is transmitted to the different administration apparatus. Thus, the different device administration apparatus is allowed to access the device, and thereby smoothly takes over the roles to administer use of the device.

(8) A device administration method comprising:

obtaining apparatus information stored in a device connected to the network, via a network;

judging whether or not the device is an administration object, based on the obtained apparatus information; and starting administration of use of the device, if it is judged that the device is an administration object.

With this device administration method, it is automatically judged whether or not the device is an administration object, and if it is judged that the device is an administration target, administration of the use is started. Thus, it is advantageous that a system administrator or etc. is allowed to skip the troublesome operation to configure a certain setting in order to make a device administration apparatus recognize devices that are administration objects.

(9) A computer readable recording medium storing in itself a device administration program to make a computer execute:

obtaining apparatus information stored in a device, via a network;

judging whether or not the device is an administration object, based on the obtained apparatus information; and starting administration of use of the device, if it is judged that the device is an administration object.

With this recording medium, a computer executes obtaining apparatus information stored in a device, judging based on the obtained apparatus information whether or not the device is an administration object, and starting administration of use of the device if it is judged that the device is an administration object.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. A device administration apparatus comprising:
    a storage that stores conditions set for specific users, the conditions being related to usage logs; and
    a hardware processor configured to:
        obtain information from a device via a network, the device being an image forming apparatus, the information being related to a usage log of at least one of the specific users, the information satisfying conditions of a number of job instructions associated with the at least one of the specific users;
        judge whether or not the information obtained from the device meets the condition set for the at least one of the specific users, the condition being stored in the storage; and;
        determine the device to be an object to be administered by the device administration apparatus and start administration of the usage of the device when the information obtained from the device meets the condition set for the at least one of the specific users, the condition being stored in the storage,
        wherein the hardware processor is configured to block access to the device from another device administration apparatus by transmitting to the device (i) an instruction to change a password of the device for permitting access to the device, from a shared password to a unique password being unique to the device administration apparatus, and (ii) the unique password, after determining the device to be an object to be administered by the device administration apparatus, the shared password being common among device administration apparatuses connected to the network, the device administration apparatuses including the device administration apparatus and the other device administration apparatus.

2. The device administration apparatus recited in claim 1, wherein when the hardware processor is unable to determine whether the information related to the usage log and obtained from the device meets the condition set for the at least one of the specific users, then the hardware processor repeatedly performs the judging of whether or not the information obtained from the device meets the condition set for the at least one of the specific users until the hardware processor is able to determine whether the information related to the usage log and obtained from the device meets the condition set for the at least one of the specific users.

3. The device administration apparatus recited in claim 1, wherein the hardware processor is further configured to give to the device an instruction to change a current, first password to a second password allowing access to the device, when the hardware processor determines the device to be an object to be administered by the device administration apparatus.

4. The device administration apparatus recited in claim 3, wherein when a function of the device administration apparatus to administer the device is disabled by a user or the hardware processor determines the device to no longer be an object to be administered by the device administration apparatus, while the hardware processor administers the device, then the hardware processor gives to the device an instruction to turn the second password back to the first password.

5. The device administration apparatus recited in claim 1, wherein the hardware processor is further configured to transmit to a different device administration apparatus a password allowing access to the device determined to be an object to be administered, when the different device administration apparatus is going to take over all or some of roles to administer the device.

6. The device administration apparatus recited in claim 1, wherein the information obtained from the device indicates a number of times each of the at least one of the specific users has used the device.

7. The device administration apparatus recited in claim 1, wherein the hardware processor automatically administers the device when the hardware processor determines the device to be an object to be administered by the device administration apparatus.

8. The device administration apparatus recited in claim 1, wherein:
    the conditions set for the specific users are that the specific users have executed more jobs than a specified number; and
    the hardware processor is configured to determine the device to be an object to be administered by the device administration apparatus when the at least one specific user has executed more jobs than the specified number.

9. A device administration method for a device administration apparatus, the method comprising:
    storing conditions set for specific users in a storage, the conditions being related to usage logs;
    obtaining information from a device via a network, the device being an image forming apparatus, the information being related to a usage log of at least one of the specific users, the information satisfying conditions of a number of job instructions associated with the at least one of the specific users;

judging whether or not the information obtained from the device meets the condition set for the at least one of the specific users, the condition being stored in the storage;

determining the device to be an object to be administered by the device administration apparatus and starting administration of the usage of the device when the information obtained from the device meets the condition set for the at least one of the specific users, the condition being stored in the storage, wherein the device administration method comprises blocking access to the device from another device administration apparatus by transmitting to the device (i) an instruction to change a password of the device for permitting access to the device, from a shared password to a unique password being unique to the device administration apparatus, and (ii) the unique password, after determining the device to be an object to be administered by the device administration apparatus, the shared password being common among device administration apparatuses connected to the network, the device administration apparatuses including the device administration apparatus and the other device administration apparatus.

10. The device administration method of claim 9, further comprising determining the device to be an object to be administered by the device administration apparatus based on a result of comparing the information obtained from the device to the conditions stored in the storage wherein when the device administration apparatus is unable to determine whether the information related to the usage log and obtained from the device meets the condition set for the at least one of the specific users, then the device administration apparatus repeatedly performs the judging of whether or not the information obtained from the device meets the condition set for the at least one of the specific users until the device administration apparatus is able to determine whether the information related to the usage log and obtained from the device meets the condition set for the at least one of the specific users.

11. The device administration method of claim 9, wherein the information obtained from the device indicates a number of times each of the at least one of the specific users has used the device.

12. The device administration method of claim 9, wherein the administration of the device is automatically started when the device is determined to be an object to be administered by the device administration apparatus.

13. The device administration method of claim 9, further comprising instructing the device to change the current, first password to a second password allowing access to the device, when determining the device to be an object to be administered by the device administration apparatus.

14. The device administration method of claim 13, further comprising, when administering the device by the device administration apparatus is disabled by a user or when the device as no longer being an object to be administered by the device administration apparatus, while administering the device by the device administration apparatus, instructing the device to turn the second password back to the first password.

15. The device administration method of claim 9, further comprising transmitting to a different device administration apparatus a password allowing access to the device determined to be an object to be administered, when the different device administration apparatus is going to take over all or some of roles to administer the device.

16. The device administration method of claim 9, wherein:

the conditions set for the specific users are that the specific users have executed more jobs than a specified number; and the device administration method comprises determining the device to be an object to be administered by the device administration apparatus when the at least one specific user has executed more jobs than the specified number.

17. A non-transitory computer readable recording medium storing in itself a device administration program to make a device administration apparatus execute steps comprising:

storing conditions set for specific users in a storage, the conditions being related to usage logs;

obtaining information from a device via a network, the device being an image forming apparatus, the information being related to a usage log of at least one of the specific users, the information satisfying conditions of a number of job instructions associated with the at least one of the specific users;

judging whether or not the information obtained from the device meets the condition set for the at least one of the specific users, the condition being stored in the storage;

determining the device to be an object to be administered by the device administration apparatus and starting administration of the usage of the device when the information obtained from the device meets the condition set for the at least one of the specific users, the condition being stored in the storage, wherein the steps further comprise blocking access to the device from another device administration apparatus by transmitting to the device (i) an instruction to change a password of the device for permitting access to the device, from a shared password to a unique password being unique to the device administration apparatus, and (ii) the unique password, after determining the device to be an object to be administered by the device administration apparatus, the shared password being common among device administration apparatuses connected to the network, the device administration apparatuses including the device administration apparatus and the other device administration apparatus.

18. The non-transitory computer readable recording medium of claim 17, the steps further comprising determining the device an object to be administered by the device administration apparatus based on a result of comparing the information obtained from the device to the conditions stored in the storage, wherein when the device administration apparatus is unable to determine whether the information related to the usage log and obtained from the device meets the condition set for the at least one of the specific users, then the device administration apparatus repeatedly performs the judging of whether or not the information obtained from the device meets the condition set for the at least one of the specific users until the device administration apparatus is able to determine whether the information related to the usage log and obtained from the device meets the condition set for the at least one of the specific users.

19. The non-transitory computer readable recording medium of claim 17, wherein the information obtained from the device indicates a number of times each of the at least one of the specific users has used the device.

20. The non-transitory computer readable recording medium of claim 17, wherein the administration of the device is automatically started the device is determined to be an object to be administered by the device administration apparatus.

21. The non-transitory computer readable recording medium of claim 17, the steps further comprising instructing the device to change the current, first password to a second password allowing access to the device, when determining the device to be an object to be administered by the device administration apparatus.

22. The non-transitory computer readable recording medium of claim 21, the steps further comprising, when administering the device by the device administration apparatus is disabled by a user or when determining the device to no longer be an object to be administered by the device administration apparatus, while administering the device by the device administration apparatus, instructing the device to turn the second password back to the first password.

23. The non-transitory computer readable recording medium of claim 17, the steps further comprising transmitting to a different device administration apparatus a password allowing access to the device determined to be an object to be administered, when the different device administration apparatus is going to take over all or some of roles to administer the device.

24. The non-transitory computer readable recording medium of claim 17, wherein:
the conditions set for the specific users are that the specific users have executed more jobs than a specified number; and
the steps further comprising determining the device to be an object to be administered by the device administration apparatus when the at least one specific user has executed more jobs than the specified number.

* * * * *